United States Patent [19]
Gollick

[11] Patent Number: 5,279,232
[45] Date of Patent: Jan. 18, 1994

[54] MODULAR SHELVING INTERCONNECTION ASSEMBLY

[76] Inventor: Thomas W. Gollick, 2017 White Pine La., Boise, Id. 83706

[21] Appl. No.: 988,248

[22] Filed: Dec. 9, 1992

[51] Int. Cl.⁵ .............................................. A47B 47/00
[52] U.S. Cl. .................................... 108/109; 108/111; 108/153
[58] Field of Search ............... 108/109, 110, 111, 153; 403/247, 256, 374, 49

[56] References Cited

U.S. PATENT DOCUMENTS

| | | | |
|---|---|---|---|
| 182,669 | 9/1876 | Homes | 108/111 |
| 500,447 | 6/1893 | Walker | |
| 2,366,676 | 1/1945 | Rosenthal | 108/111 |
| 2,825,101 | 3/1958 | Rubenstein | 108/111 X |
| 3,672,739 | 6/1972 | Taut | 312/107 |
| 3,791,707 | 2/1974 | House | 312/111 |
| 3,811,785 | 5/1974 | Hagglund | 403/255 |
| 4,153,311 | 5/1979 | Takahashi | 312/107 |
| 4,169,639 | 10/1979 | Zola | 312/265 |
| 5,065,873 | 11/1991 | Tseng | 108/111 X |

Primary Examiner—Clifford D. Crowder
Assistant Examiner—Paul C. Lewis
Attorney, Agent, or Firm—Frank J. Dykas; Craig M. Korfanta; Ken J. Pedersen

[57] ABSTRACT

A modular shelving interconnection assembly is disclosed. The assembly has two (2) substantially upright, spaced-apart side panels with holes extending through their lateral surfaces at approximately equal distances from their bottoms. Tabs of shelf support units extend through the holes in the side panels. Pegs in the shape of split, truncated cones extend through the holes in the tab on the outside of the panels, and cooperate with the holes in the tabs and the outside surface of the panels to secure the shelf-support units to the panels. The modular assembly may be repeated in the direction of the shelf support unit to extend it to a wall-length shelving unit.

5 Claims, 2 Drawing Sheets

MODULAR SHELVING INTERCONNECTION ASSEMBLY

BACKGROUND OF THE INVENTION

1. Technical Field

This invention relates generally to furniture, and more particularly to knock-down, modular shelving. I have invented a special interconnection assembly which permits ease and speed when putting up or knocking down modular shelving.

2. Background Art

U. S. Pat. No. 3,672,739 (Taut) discloses a modular, knock-down cabinet with an intraconnection system made of notches which create a discontinuous groove for a locking rod.

U.S. Pat. No. 3,811,785 (Hacclund) discloses a concealed interconnection system for hollow tubes with a 2-pronged clamp extending from one of the tubes into the other. A wedge between the prongs of the first tube secures the clamp within the second tube.

U.S. Pat. No. 4,153,311 (Takahashi) discloses modular, knock-down shelving with an interconnection system which a long board capable of interlocking with side and rear wall sections of two spaced-apart sectional units.

U. S. Pat. No. 4,169,639 (Zola) discloses a knock-down, modular shelving unit with an intraconnection system which is a pair of rods with 90° bends at both ends and pivotally connected at their centers. The bent rod ends cooperate with drilled holes near the edges of wall panels to secure the panels together.

Still, there is a need in the modular shelving furniture industry for an attractive, easy, economical and fast interconnection assembly.

DISCLOSURE OF INVENTION

My invention is a modular shelving assembly which has two (2) substantially upright, spaced-apart side panels with holes extending through them at approximately equal distances from their bottoms. Tabs of shelves or shelf support units with holes near their ends extend through the holes in the side panels, but the rest of the shelves or shelf support units do not extend through the holes. Pegs in the shape of split, truncated cones extend through the holes in the tabs on the outside of the panels, and cooperate and bind with the holes in the tabs and the outside surface of the panels to secure the shelves or shelf support units to the panels.

My assembly may be repeated in the parallel direction of the shelves or shelf support units to extend and become a wall-length shelving unit.

BEST MODE FOR CARRYING OUT INVENTION

Figure 1:
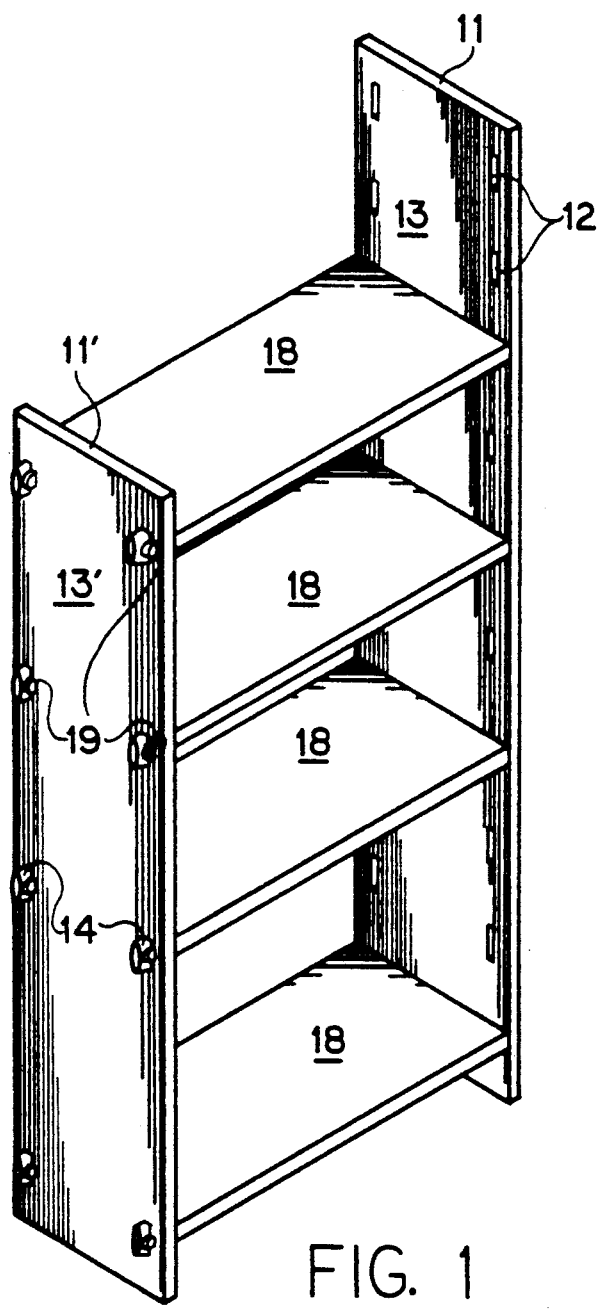
FIG. 1 is an isometric view of one unit of my modular assembly with four (4) shelves and eight (8) shelf support units.

Referring to the FIGS., there is depicted generally my modular shelving assembly 10. Assembly 10 has two substantially upright, spaced-apart side panels 11 and 11'. Panels 11 and 11' have a plurality of holes 12 extending through their lateral surfaces 13 and 13'. Here, the holes 12 are provided in pairs near the side edges of both panels 11 and 11'. Also, a pair of holes 12 in panel 11 are provided to be at approximately equal distance from panel 11's bottom edge as a corresponding pair of holes 12 in panel 11' are provided to be at the same distance from its bottom edge.

Figure 2:
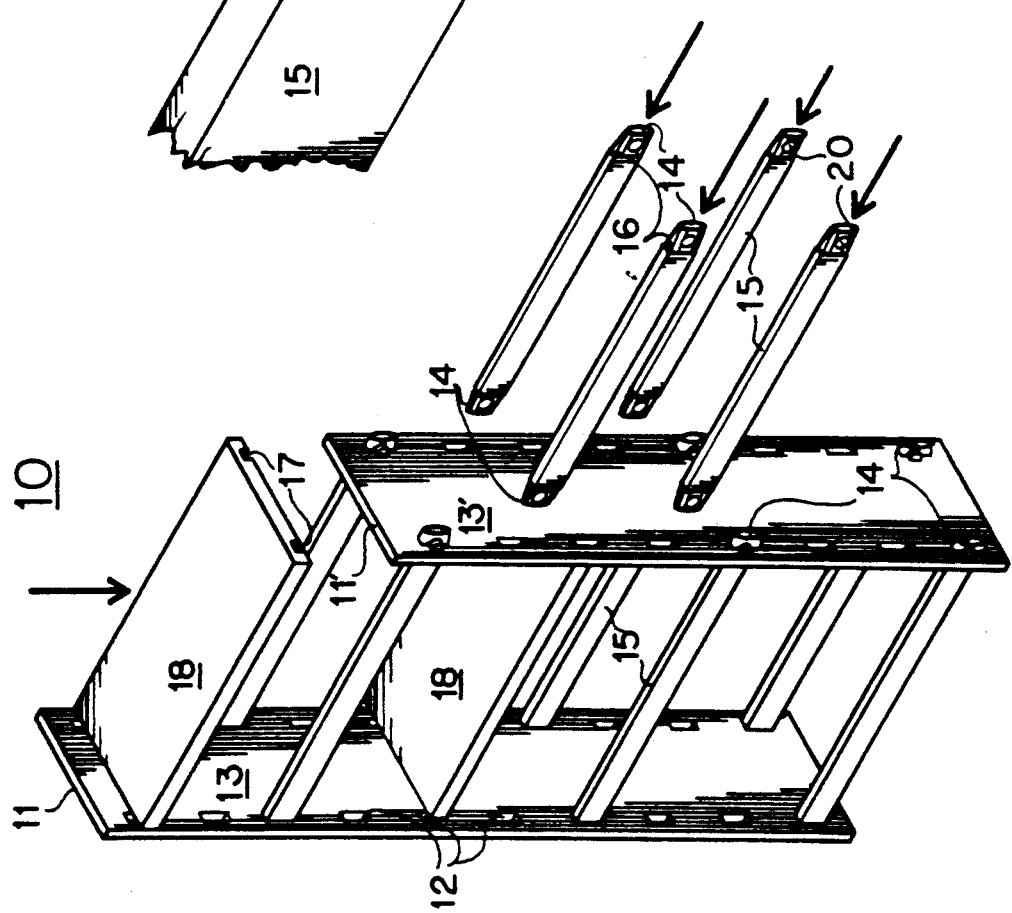
FIG. 2 is a partial, reverse, exploded view of the view depicted in FIG. 1.

Holes 12 receive tabs which extend from each end of shelf support units 15. Tabs 14 are a region of reduced cross-section of shelf support unit 15 at its ends. Tab 14 has a shoulder 16 where the tab meets the rest of the shelf support unit 15. Shelf support unit 15 is here a rectangular slat usually several feet in length, several inches in height and a partial inch in width. The width of slat 15 is provided to cooperate and fit in groove 17 in the bottom of shelf 18 so that the shelf 18 is securely mounted on top of two slats 15 as shown in FIG. 2.

Figure 3:
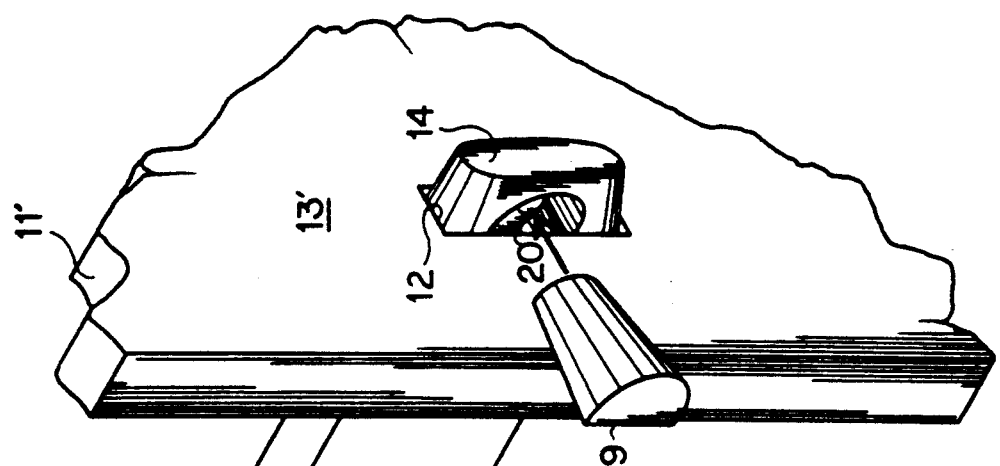
FIG. 3 is an isometric, partially-exploded detail view of a tapered peg of my invention, and its method of insertion into the hole of a shelf support tab and its cooperation with the outer surface of a side panel.

Pegs 19 in the shape of split, truncated cones extend through holes 20 near the ends of tabs 14 on shelf units 15. The flat side surface of peg 19 cooperates and binds with the outer lateral surface 13 or 13' of side panels 11 and 11'. The round side surface of peg 19 cooperates and binds with the surface of hole 20. Peg 19 is sized so that it extends partly through hole 20, but not all the way through it, when tab 14 is extending through hole 12 of panel 11' as shown in FIG. 3. This way, a convenient friction fit is created between panel 11', tab hole 20 and the flat and round side surfaces, respectively, of peg 19. This friction fit is easily created by inserting peg 19 and tapping it gently on the back end to tighten it. Also, this friction fit is easily eliminated by tapping peg 19 gently on the front end to loosen it, and removing it.

My assembly may be repeated in the parallel direction of shelf support units and/or shelves to multiply and extend to become a wall-length shelving unit. In this case, a third side panel is added to create a second assembly, and, a fourth side panel is added to create a third assembly, etc., or n+1 side panels for n assemblies. Also, my assembly may be repeated in the perpendicular direction by adding an extra side panel perpendicular to the first 2 panels, and then the fourth panel parallel to the third, extra panel. Also, my assembly may be used to connect parts of furniture besides shelving, like bed frames and desks and tables, for example.

Also, the shelf support units and the shelves pictured here may be provided in one piece. Or, the shelf itself may have a tab on each end for insertion through the holes in the side panels. In this case the shelf tabs may be horizontal tabs wide enough in the horizontal direction to provide adequate support for the shelf and to prevent the shelf from tipping, or rotating. when it is secured between the two panels. The best mode of my assembly, however, is like that depicted in the FIGS.

My assembly may be made from conventional materials by conventional techniques. I prefer a veneered wood for panels 11 and 11', shelf support units 15 and shelves 18. I prefer solid hardwood for pegs 19.

While there is shown and described the present preferred embodiment of the invention, it is to be distinctly understood that this invention is not limited thereto but may be variously embodied to practice within the scope of the following claims.

I claim:

1. A modular shelving interconnection assembly comprising:

two (2) substantially upright, spaced-apart side panels, said panels having a plurality of pairs of holes extending through their lateral surfaces at approximately equal distances from their bottom edges;

a plurality of substantially horizontal shelf support units, said shelf support units having two (2) ends and two (2) tabs, with a tab extending from each end, said tabs having holes extending through them, and said tabs being adapted to extend through the holes in said panels, but not to permit the rest of the said shelf support units to extend through said holes in said panels;

two (2) pegs for each of said shelf support units, said pegs being adapted to extend through and cooperate and bind with the holes in the tabs at the ends of the said shelf support units, and to cooperate and bind with the outside surfaces of the panels through which the tabs extend in order to secure the said shelf support units to the panels; and a substantially horizontal shelf, with a shelf support cooperation means in its bottom for cooperating with said shelf support units so that said shelf is securely mounted on top of said shelf support units.

2. The interconnection assembly of claim 1 wherein there are two (2) shelf support units for each shelf.

3. The interconnection assembly of claim 1 wherein the shelf support units are rectangular slats several feet in length, several inches in height and a partial inch in width.

4. The interconnection assembly of claim 1 wherein the pegs are in the shape of split, truncated cones.

5. The interconnection assembly of claim 1 wherein the shelf support cooperation means is a plurality of grooves in the bottom of the shelf, each of said grooves for fitting with one of said shelf support units.

* * * * *